United States Patent [19]

Shinomura

[11] 4,100,238
[45] Jul. 11, 1978

[54] PROCESS FOR PRODUCING PERMEABLE MEMBRANES

[75] Inventor: Toshihiko Shinomura, Yokohama, Japan

[73] Assignee: Nippon Oil Company, Ltd., Tokyo, Japan

[21] Appl. No.: 669,450

[22] Filed: Mar. 22, 1976

[30] Foreign Application Priority Data

Mar. 20, 1975 [JP] Japan .................................. 50-32956

[51] Int. Cl.$^2$ ............................................. B29D 27/00
[52] U.S. Cl. ................................. 264/49; 210/500 M; 264/210 R; 264/DIG. 13; 429/254; 521/61; 521/918
[58] Field of Search ............. 264/49, 210 R, DIG. 13; 210/500 M; 429/254; 260/25 M

[56] References Cited

U.S. PATENT DOCUMENTS

| 3,734,986 | 5/1973 | Kato et al. | 264/49 |
| 3,796,778 | 3/1974 | Gallacher | 264/49 |
| 3,819,782 | 6/1974 | Irie | 264/49 |
| 3,833,708 | 9/1974 | Miller et al. | 264/49 X |
| 3,852,224 | 12/1974 | Bridgeford | 264/49 X |

FOREIGN PATENT DOCUMENTS

| 45-11,449 | 4/1970 | Japan | 264/49 |
| 6,512,918 | 9/1966 | Netherlands | 264/49 |
| 1,199,566 | 7/1970 | United Kingdom | 264/49 |

*Primary Examiner*—Philip Anderson
*Attorney, Agent, or Firm*—Wenderoth, Lind & Ponack

[57] ABSTRACT

A process for preparing permeable membranes which comprises kneading in the molten state two different kinds of thermoplastic synthetic resins which are partly compatible with each other, fabricating the molten mixture into a sheet, film or hollow article, treating the fabricated article with a solvent which is a good solvent for one of the component resins but is a poor solvent for the other to dissolve and remove the former resin, drying the fabricated article, and then stretching it. In place of the resin to be removed by the solvent, rubbers or oligomers having partial compatibility with the resin which remains undissolved can be used.

4 Claims, No Drawings

PROCESS FOR PRODUCING PERMEABLE MEMBRANES

This invention relates to a process for producing a permeable membrane from a polymer having stretchability, especially a permselective membrane suitable for use as a reverse osmosis membrane, a battery separator, a microbe-free packaging material, a filter, or the like.

Some methods for producing a permeable membrane using a polymer as a substrate have already been suggested. For example, a process for preparing a reverse osmosis membrane by the wet method which comprises casting a solution of cellulose acetate or an aromatic polyamide, evaporating part of the solvent, then placing the cast solution in a coagulating bath, and then annealing the resulting membrane [S. Loeb, S. Sourirajan, Report No. 60-60, Department of Enginnering, University of California, Los Angeles (1960)], and a process for preparing a reverse osmosis membrane by the dry method which involves evaporating the solvent completely without using a coagulation process [R. E. Kesting, J. Appl. Polymer Sci., 17, 1771 (1973)] were suggested.

Furthermore, a process for producing a microporous film by extruding a crystalline polyolefin, polyamide, polyester or polyoxymethylene into a film and heat-treating the resulting film has been known [H. S. Bierenbaum, R. B. Isaacson, M. L. Druin, S. G. Plovan, Industrial & Engineering Chemistry Product Research and Development, 13, 2 (1974)]. The microporous film has, to some extent, found applications as a battery separator, and in the medical field as a microbe-free packaging material for injection syringes and a barrier against bacteria.

These processes, however, are complicated, lend themselves to difficult pore size control, and are costly, and moreover, the cellulose acetate membranes are subject to putrefaction by microorganisms.

It is an object of this invention therefore to provide a process which lends itself to easy pore size control, and which can yield permselective films having the desired pore size over a wide range and superior resistance to putrefaction and chemicals.

The above object can be achieved in accordance with this invention by a process for producing permeable membranes, which comprises mixing in the molten state (A) 90 to 30 parts by weight of at least one thermoplastic linear organic synthetic resin having stretchability with (B) 10 to 70 parts by weight of at least one compound having partial compatibility with the synthetic resin (A) and selected from the group consisting of synthetic polymers or oligomers containing at least 20 carbon atoms, natural organic polymeric compounds containing at least 20 carbon atoms, fatty acids containing at least 16 carbon atoms, and esters or salts of said fatty acids, the total amount of components (A) and (B) being 100 parts by weight; fabricating the molten mixture into a film, sheet or hollow article in which components (A) and (B) are present in the partly mutually dissolved state; treating said film, sheet or hollow article with a solvent which is a good solvent for component (B) but a poor solvent for component (A); drying the fabricated article so treated; and then stretching it 50 to 1500% monoaxially or biaxially.

When it is stated in the present invention that components (A) and (B) are mixed in the molten state, it means that components (A) and (B) are mixed at a temperature above the melting temperatures of these components but lower than their heat decomposition temperatures. The "melting temperature", as used herein, denotes the melting point of a crystalline compound or the glass transition point of an amorphous compound. Furthermore, the "heat decomposition temperature", as used herein, denotes a temperature at which the molecules of the components (A) and (B) are cleaved by heat.

The permeable membrane in accordance with this invention can be obtained in the form of a flat film or sheet, or a hollow article such as a tubular film or sheet or hollow filaments.

The synthetic resin component (A) used in the process of this invention is a thermoplastic linear organic synthetic resin which can be fabricated into films, sheets or filaments and can be stretched. The synthetic resin (A) forms the main body of the permeable membrane in accordance with the process of this invention.

Examples of preferred synthetic resins as component (A) include isotactic polypropylene having a melt index of 0.2 to 30; polypropylene modified with an unsaturated aliphatic carboxylic acid, for example, isotactic polypropylene modified with up to 10% by weight of maleic anhydride (to be referred to as maleinized polypropylene in the present application) or acrylic acid (to be referred to as acrylate-modified polypropylene in the present application); polypropylene modified with up to 20% by weight of chlorine (to be referred to as chlorinated polypropylene in the present application); polypropylene modified with up to 10% by weight of sulfonic acid (to be referred to as sulfonated polypropylene in the present application); polyethylene having a melt index of 0.1 to 60 and a density of 0.91 to 0.97; polyethylene modified with an unsaturated aliphatic carboxylic acid, for example, polyethylene modified with up to 10% by weight of maleic anhydride (to be referred to as maleinized polyethylene in the present application) or acrylic acid (to be referred to as acrylate-modified polyethylene in the present application); polyethylene modified with up to 20% by weight of chlorine (to be referred to as chlorinated polyethylene in the present application); polyethylene modified with up to 10% by weight of sulfonic acid (to be referred to as sulfonated polyethylene in the present application); thermoplastic linear polyamides, for example, aliphatic polyamides or copolyamides with the alkylene group containing 1 to 20 carbon atoms such as nylon 6, nylon 66, nylon 11, nylon 12, nylon 6-9, nylon 6-10, nylon 6-12 and nylon 6-nylon 66 copolymer, and aromatic polyamides such as a polyamide containing a recurring unit of the formula

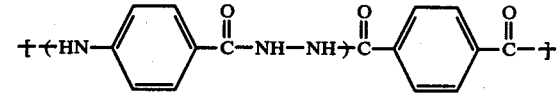

a polyamide containing a recurring unit of the following formula

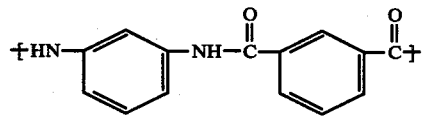

and a polyamide containing a recurring unit of the following formula

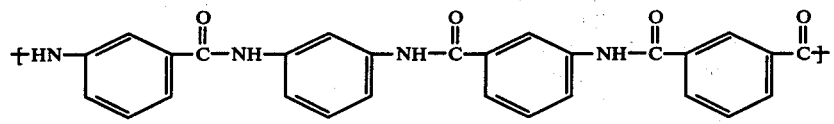

(to be referred to as polyamides in the present application); polyalkylene terephthalates such as polyethylene terephthalate or polybutylene terephthalate, or copolyesters resulting from replacing up to about 20% of terephthalic acid in the polyalkylene terephthalates by another aliphatic or aromatic carboxylic acid such as isophthalic acid, sebacic acid or adipic acid (to be referred to as linear polyesters in the present application); polystyrene having a melt index of 0.1 to 20; an ABS resin having a density of 1.0 to 1.2; a styrene/acrylonitrile copolymer containing 2 to 50% by weight of an acrylonitrile unit; polyvinyl chloride having an average degree of polymerization of 500 to 4,000; an ethylene/vinyl acetate copolymer having a melt index of 0.2 to 500 and containing 2 to 50% by weight of a vinyl acetate unit; an ethylene/acrylic acid copolymer containing 2 to 50% by weight of an acrylic acid unit; an ethylene/maleic acid copolymer containing 2 to 50% by weight of a maleic acid unit; a propylene/acrylic acid copolymer containing 2 to 50% by weight of an acrylic acid unit; a propylene/maleic acid copolymer containing 2 to 50% by weight of a maleic acid unit; atactic polypropylene having a melt index of 0.2 to 70; polyvinyl alcohol having a melt index of 0.1 to 400; polyvinyl acetate having a melt index of 0.2 to 100; a polyalkylene oxide having an average molecular weight of 100,000 to 10,000,000; poly(butene-1) having a melt index of 0.1 to 400; an ethylene/propylene copolymer containing 20 to 80% by weight of a propylene unit; and polymethyl methacrylate having a melt index of 0.2 to 20.

Mixtures of at least two of the above-exemplified mixtures can also be used.

The compound (B) used in the present invention is a component which is partly or wholly dissolved and removed from the film, sheet or hollow article in the step of solvent treatment. Accordingly, the component (B) is either absent or partly present in the final permselective membrane in accordance with this invention.

Examples of preferred compounds as component (B) are those exemplified as component (A), either alone or in admixture, and additionally include rosin and dehydrogenated, hydrated or maleinized rosin; terpene resins; natural rubbers having a Mooney viscosity of 100 to 10; petroleum waxes such as paraffin wax or microcrystalline wax, and natural waxes containing about 20 to 60 carbon atoms such as carnauba wax; asphalt and gilsonite; synthetic waxes such as polyethylene-decomposed wax, waxy ethylene polymers, or Fischer-Tropsch wax; modified synthetic waxes such as maleinized wax obtained by modifying synthetic wax with up to 10% by weight of maleic anhydride, acrylate-modified wax obtained by modifying synthetic wax with up to 10% by weight of acrylic acid, chlorinated wax obtained by modifying synthetic wax with up to 20% by weight of chlorine, and sulfonated wax obtained by modifying wax with up to 10% by weight of sulfonic acid; chlorinated natural wax; resins prepared by thermal polymerization of petroleum resins or cyclopentadiene; maleinized petroleum resins obtained by modifying petroleum resins with maleic acid; hydrogenated petroleum resins; substantially unvulcanized synthetic rubbers having a Mooney viscosity of less than about 100, such as a styrene/butadiene rubber with a styrene content of 5 to 50% by weight, a nitrile rubber, a butadiene rubber, an isoprene rubber, a butyl rubber, a polychloroprene rubber, a polyisobutylene rubber, and an ethylene/propylene/diene terpolymer rubber having a propylene content of 20 to 70% by weight and a diene content of not more than 10% by weight; and polybutene having a melt index of 0.1 to 400 obtained by polymerizing a mixture of butene and butane in the presence of a Friedel-Crafts catalyst.

However, it is impossible to choose any desired combination of components (A) and (B), but the choice should be such that component (A) is sparingly soluble in a solvent used in the solvent treatment step, and component (B) is readily soluble in the solvent. In addition, component (B) should be partly compatible with component (A).

In the present application, components (A) and (B) are partly compatible with each other when a sheet prepared from a molten mixture of the components (A) and (B) has a non-transparency on stretching, as measured by the method to be described, of not more than 80%, and a non-transparency on solvent-treatment, as measured by the method to be described, of at least 30%.

Preferably, the components (A) and (B) are selected so that the stretching non-transparency is not more than 50%, and the solvent treatment non-transparency is at least 50%.

Non-transparency on stretching

A 0.5 mm-thick sheet composed of 70% by weight of component (A) and 30% by weight of component (B) is set in a tenter biaxial stretcher in a constant temperature tank in which the air is held at a temperature lower than the melting temperature of the sheet to a point 20° C below the melting temperature, and allowed to stand for 10 minutes. The sheet is biaxially stretched simultaneously at a stretch ratio of 3 in each of the longitudinal and transverse directions at a deformation speed of 600%/min. The non-transparency (%) of the resulting film is measured by the method of JIS P-8138-1963, and represents the non-transparency on stretching.

Non-transparency on solvent treatment

A 0.5 mm-thick sheet composed of 70% by weight of component (A) and 30% by weight of component (B) is immersed for 30 minutes in a solvent which is a good solvent for component (B) but is a poor solvent for component (A), and then dried. The non-transparency (%) of the sheet is measured by the method of JIS P-8138-1963, and represents the non-transparency on solvent treatment.

The above non-transparency on stretching shows that a clear phase separation does not occur in the interface between a phase of component (A) and a phase of component (B), and to some extent, their molecules are dissolved mutually. The non-transparency on solvent treatment shows that the molecules of components (A) and (B) are not completely dissolved mutually.

When the synthetic resin or compound dissolves in a concentration of at least 5% by weight in the solvent at the temperature of use, the solvent is a good solvent for the synthetic resin or compound (the synthetic resin or compound is readily soluble in the solvent). When it dissolves in the solvent in a concentration of less than 5% by weight, the synthetic resin or compound is sparingly soluble in the solvent and the solvent is a poor solvent for the synthetic resin or compound.

The above solubility can be evaulated by adding 5% by weight of the resin or compound in the form of granule, film, powder or liquid to the solvent at a predetermined solvent treatment temperature, stirring the mixture sufficiently for 3 hours, and determining whether it dissolves completely or not.

Examples of suitable combinations of components (A) and (B) in the present invention are shown in Table 1.

Table 1

| Examples of combination of Component (A), Component (B) and Solvent | | |
|---|---|---|
| Component (A) | Component (B) | Solvent |
| Isotactic polypropylene, maleinized polypropylene, acrylate-modified polypropylene, chlorinated polypropylene, sulfonated polypropylene | Polyethylene | Mixed xylene, toluene, tetrachloroethylene |
| | Polyethylene oxide | Water, methanol |
| | Ethylene-vinyl acetate copolymer Ethylene-acrylic acid copolymer Ethylene-maleic acid copolymer | Mixed xylene, toluene, tetrachloroethylene |
| | Polystyrene | Toluene, mixed xylene, tetrachloroethylene, butyl acetate, dioxane, pyridine |
| | Atactic polypropylene | Cyclohexane, decalin, toluene, benzene, mixed xylene, tetrachloroethylene |
| | Nylon 6 | m-cresol, chlorophenol, acetic acid |
| | Poly(butene-1) | ethyl cyclohexane |
| Isotactic polypropylene, maleinized polypropylene, acrylate-modified polypropylene, chlorinated polypropylene, sulfonated polypropylene | Wax | Mixed xylene, toluene, tetrachloroethylene |
| | Ethylene-propylene copolymer | Mixed xylene, toluene, tetrachloroethylene |
| | Styrene-butadiene copolymer Natural rubber Polybutadiene rubber Polyisoprene rubber Isobutylene-isoprene copolymeric rubber polyisobutylene | Toluene, benzene, mixed xylene, tetrachloroethylene |
| | Polyvinyl alcohol | Water, methanol |
| | Maleinized polyethylene, acrylate-modified polyethylene, chlorinated polyethylene, sulfonated polyethylene | Mixed xylene, toluene, tetrachloroethylene |
| Isotactic polypropylene, maleinized polypropylene, acrylate-modified polypropylene, chlorinated polypropylene, sulfonated polypropylene | Polymethyl methacrylate | Acetone, formic acid, chloroform, dichloroethylene |
| Isotactic polypropylene | Maleinized polypropylene, acrylate-modified polypropylene, chlorinated polypropylene, sulfonated polypropylene, propylene-acrylic acid copolymer propylene-maleic acid copolymer | Mixed xylene, toluene, tetrachloroethylene |
| Polyethylene, maleinized polyethylene, acrylate-modified polyethylene, chlorinated polyethylene, sulfonated polyethylene | Ethylene-vinyl acetate copolymer | Mixed xylene, toluene, tetrachloroethylene |
| | Wax | |
| | Atactic polypropylene | cyclohexane, benzene, toluene, mixed xylene, tetrachloroethylene |
| | Ethylene-acrylic acid copolymer | Mixed xylene, toluene, tetrachloroethylene |
| Polyethylene, maleinized polyethylene, acrylate-modified polyethylene, chlorinated polyethylene, sulfonated polyethylene | Nylon 6 | m-cresol, chlorophenol, acetic acid |
| | Nylon 66 | Phenol, cresol |
| | Polystyrene | Butyl acetate, toluene, mixed xylene, tetrachloroethylene |
| | Poly(butene-1) | Ethyl cyclohexane |
| | Polyethylene oxide | Water, methanol |
| | Ethylene-propylene copolymer Ethylene-maleic acid copolymer | Mixed xylene, toluene, tetrachloroethylene |
| | Polyvinyl alcohol | Water, methanol |

Table 1-continued

Examples of combination of Component (A), Component (B) and Solvent

| Component (A) | Component (B) | Solvent |
|---|---|---|
| | Styrene-butadiene copolymer | Toluene, benzene, mixed xylene, tetrachloroethylene |
| | Natural rubber | Toluene, benzene, mixed xylene, tetrachloroethylene |
| Polyethylene, maleinized polyethylene, acrylate-modified polyethylene, chlorinated polyethylene, sulfonated polyethylene | Polybutadiene rubber Polyisoprene rubber, Isobutylene-isoprene copolymer rubber, Polyisobutylene | Toluene, benzene, mixed xylene, tetrachloroethylene |
| | Propylene-acrylic acid copolymer Propylene-maleic acid copolymer | Toluene, mixed xylene, tetrachloroethylene |
| | Polymethyl methacrylate | Acetone, formic acid, chloroform, dichloroethylene |
| Polyamide, linear polyesters | Polyethylene | Mixed xylene, toluene, tetrachloroethylene |
| | Polyethylene oxide | Water, methanol |
| | Ethylene-vinyl acetate copolymer Ethylene-acrylic acid copolymer | Mixed xylene, toluene, tetrachloroethylene |
| | Polystyrene | Butyl acetate, toluene, ethylene-dichloride, trichloroethylene, tetrachloroethylene, mixed xylene |
| Polyamide, linear polyesters | Wax | Mixed xylene, toluene, tetrachloroethylene |
| | Poly(butene-1) | Ethylcyclohexane |
| | Isotactic polypropylene | Decalin, tetralin |
| | Atactic polypropylene | Cyclohexane, decalin, tetralin, toluene, mixed xylene, benzene, tetrachloroethylene |
| | polyvinyl alcohol | Water, methanol |
| | Polyvinyl acetate | Ethanol, butanol, isopropyl alcohol, acetone, acetic acid ester |
| | Ethylene-maleic acid copolymer | Mixed xylene, toluene, tetrachloroethylene |
| | propylene-acrylic acid copolymer | Decalin, tetralin, cyclohexane, toluene, mixed xylene, benzene tetrachloroethylene |
| Polyamide, linear polyesters | Propylene-maleic acid copolymer maleinized polypropylene, acrylate-modified polypropylene, chlorinated polypropylene, sulfonated polypropylene, maleinized polyethylene, acrylate-modified polyethylene, chlorinated polyethylene, sulfonated polyethylene | Decalin, tetralin, cyclohexane, toluene, mixed xylene, benzene, tetrachloroethylene |
| | Polyvinyl chloride | Cyclohexane, nitroethane, pyridine |
| | Polymethyl methacrylate | Acetone, chloroform, ethylene dichloride |
| Nylon 66 | Nylon 6 | Chlorophenol, acetic acid |
| Linear polyesters | Nylon 6 Nylon 66 | Phenol, cresol |
| Polystyrene, ABS resin, acrylonitrile-styrene copolymer, styrene-divinyl-benzene copolymer | Styrene-butadiene copolymer Natural rubber Polybutadiene rubber Polyisoprene rubber Isobutylene-isoprene copolymer rubber Polyisobutylene | Diisobutylene, tricresyl phosphate, cyclohexane |
| Polystyrene, ABS resin, acrylonitrile-styrene copolymer, styrene-divinyl-benzene copolymer | Polymethyl methacrylate | Acetone, formic acid |
| | Polyvinyl acetate | Ethanol, isopropyl alcohol, n-butanol, formic acid |
| | Polyethylene oxide Polyvinyl alcohol | Water, methanol |
| | Atactic polypropylene | Cyclohexane |
| | Polyvinyl chloride | Cyclohexane, nitroethane, chloroform |
| Polyvinyl chloride | Polyvinyl acetate | Ethanol, butanol, isopropyl alcohol, acetone, ethyl acetate, formic acid, acetic acid |
| | Polymethyl methacrylate | Acetone, chloroform, formic acid |
| | Polystyrene | Toluene, tetrachloroethylene, ethylene trichloride, ethylene dichloride, butyl acetate, dioxane |
| Polyvinyl chloride | Ethylene-vinyl acetate copolymer Ethylene-acrylic acid copolymer Ethylene-maleic acid copolymer | Toluene, mixed xylene, tetrachloroethylene |

Table 1-continued

| Examples of combination of Component (A), Component (B) and Solvent | | |
|---|---|---|
| Component (A) | Component (B) | Solvent |
| | Propylene-acrylic acid copolymer | |
| | Propylene-maleic acid copolymer | |
| | maleinized polyethylene, acrylate-modified polyethylene, chlorinated polyethylene, sulfonated polyethylene, maleinized polypropylene, acrylate-modified polypropylene, chlorinated polypropylene, sulfonated polypropylene | |
| | Polyethylene oxide | Water, methanol |
| | Polyvinyl alcohol | |
| | Polychloroprene | Mixed xylene, toluene, tetrachloroethylene, carbon tetrachloride, butyl actate |
| | Butadiene-acrylonitrile copolymer | |

The proportions of components (A) and (B) are such that the amount of component (A) is 90 to 30 parts by weight, the amount of component (B) is 10 to 70 parts by weight, and the total amount of these components is 100 parts by weight. If the amount of component (B) is less than 10 parts by weight, it is impossible to impart the desired open pore structure to the resulting permeable membrane. When it is larger than 70 parts by weight, the sheet, film or hollow article cannot retain its shape after solvent treatment. Preferably, component (A) is used in an amount of 80 to 40 parts by weight, and component (B), in an amount of 20 to 60 parts by weight.

The components (A) and (B) selected according to the above-described standards are mixed in the molten state, and fabricated into a flat sheet or film having a thickness of not more than 5 mm, preferably not more than 2 mm, or a hollow article.

The mixing of the components (A) and (B) can be performed by any known means, but it is advisable that the components are mixed and kneaded in the molten state using a Banbury mixer, kneader, roller, or extruder. This yields a composition in which components (A) and (B) are partly dissolved mutually.

The method for fabricating the composition into a sheet, film or hollow article is not special in particular, but any desired known means can be employed. For example, an extruder-T die method, an inflation method, a calender roll method, and a press forming method are suitable.

The hollow article can be obtained by extruding the composition from an annular nozzle.

The intermediate fabricated article in the form of a sheet, film, or hollow article is then treated with the solvent selected on the above standard. According to the desired final product, the fabricated article can be treated either at both surfaces or at one surface. The solvent treatment can be carried out by bringing the intermediate fabricated article into contact with the solvent at a predetermined temperature for a predetermined period of time by any desired means.

The contacting of the intermediate fabricated article with the solvent is carried out until 30 to 100% by weight, preferably 50 to 100% by weight, of the component (B) contained in the intermediate fabricated article is removed.

The treating temperature and time suitable in this invention are selected according to the combination of the components (A) and (B) and the solvent, and the desired properties of the final product. Generally, however, the contacting is carried out using the solvent at a temperature of at least 10° C and below the boiling point of the solvent for 10 seconds to 60 minutes, preferably 1 to 30 minutes.

The contacting between the intermediate fabricated article and the solvent can be conveniently carried out by an immersion method in which the fabricated article is immersed in the solvent at a predetermined temperature for a predetermined period of time and then withdrawn. It can also be carried out by continuously flowing or jetting out the solvent onto the surface of the intermediate fabricated article.

The intermediate fabricated article is dried before stretching. After the solvent treatment, the fabricated article is dried until the amount of the solvent adhering to or contained in the fabricated article is decreased to not more than 50% by weight (based on the total weight of the fabricated article and the solvent), preferably not more than 10% by weight.

If the fabricated article is stretched without drying while the remaining component (B) is in the wet state, foaming occurs in the stretching step to develop coarse foams which deteriorate the properties of the product or cause stretching breakage of the product. Furthermore, a composite membrane structure inherent to the permeable membrane obtained by the method of this invention, as will be described below, does not occur.

The method of drying is not a special one, but any known methods can be used such as the blowing of air or nitrogen gas, drying at reduced pressure, or the passing of a hot air or nitrogen into a drying chamber.

In order to increase the efficiency of drying, the solvent-treated fabricated article may be immersed in a solvent highly miscible with the solvent used and readily evaporable, such as acetone or alcohols, prior to drying.

Sometimes, the sheet is creased during the solvent treatment. In such a case, the sheet is immersed in the solvent while being placed under tension by a roll or tenter, and dried.

The sheet is then stretched monoaxially or biaxially. The method of stretching is not particularly limited, but a monoaxially stretching method using rolls, a monoaxially stretching method using a roll or tenter for restraining the sheet, a successive biaxially stretching method comprising longitudinal stretching by rolls and transverse stretching by a tenter, a simultaneous biaxially stretching method using a tenter, a biaxially stretching method using a tubular, and a stretching method by inflation, for example, are widely practiced. In short, the sheet is stretched 50 to 1500% either monoaxially or biaxially. When the stretch ratio is less than 50%, pores do not occur in the final product. If the stretching extent is above 1500%, stretching is difficult. Preferably, the stretching extent is 100 to 1000%.

When stretching is carried out biaxially, the stretch ratios in the longitudinal and transverse directions may be the same or different.

The stretching temperature is not particularly limited, but may be any temperature at which the stretching can be carried out. The monoaxial stretching or restrained monoaxial stretching is suitably carried out at a temperature below the melting temperature of the sheet, film or hollow article, but not below 0° C, preferably from a point 3° C below the melting temperature to a point 20° C below the melting temperature. The biaxial stretching is carried out suitably at a temperature below the melting temperature of the sheet, film or hollow article but not below the point 50° C lower than the melting temperature.

The process of this invention can be theoretically explained as follows:

The structure of a sheet composed of a mixture of components (A) and (B) is not a "sea-island" structure in which a phase of one component is dispersed in a matrix (continuous phase) of the other component, but it is presumed that components (A) and (B) are separated in a network structure while being dissolved mutually on their interface. When this sheet is immersed in a solvent, component (B) is wholly or partly dissolved and removed. The resulting structure is still not airpermeable. When the sheet is stretched, the sites of component (B) removed by dissolution become sites for forming pores, and network continuous pores are formed.

At this time, pore formation is relatively little near the surface of the stretched sheet, film or hollow article but relatively vigorous at its center, although no clear reason can yet be assigned for this. By properly choosing the combination of the components (A) and (B) and the solvent, the proportions of these components, the stretching temperature and the stretching ratio, a composite membrane consisting of a core layer having a network continuous porous structure and a skin layer substantially free from pores can be obtained. This composite membrane structure is advantageous for reverse osmosis membranes.

Generally, the size of pores can be controlled according to the types of the components (A) and (B), the proportions of these components, the stretching temperature, and the stretch ratio.

In the process of this invention, the fabricated article needs to be stretched after solvent treatment. Stretching of the fabricated article before solvent treatment does not afford a permselective membrane having satisfactory performance. Furthermore, even when the fabricated article is stretched first and then treated with the solvent, satisfactory performance cannot be imparted to the permeable membrane. Furthermore, in such a case, the composite membrane structure cannot be obtained. Strain also occurs as a result of solvent treatment, and a product having a uniform quality is difficult to obtain.

Stretching may be carried out before the solvent treatment. In this case, however, the fabricated article should be again stretched after solvent treatment and drying.

The pore size of the permeable membrane obtained by this invention can be controlled by heat-treating it.

If desired, suitable amounts of additives such as a filler (e.g., calcium carbonate, titanium dioxide, clay, magnesium carbonate, barium sulfate, diatomaceous earth or calcium sulfate), a fibrous substance such as polyester, nylon or glass fibers, an antioxidant, an ultraviolet absorber or a plasticizer may be added to components (A) and (B). Furthermore, if desired, the product in accordance with this invention may be subjected to a corona discharge treatment, oxidizer treatment or surfactant treatment.

The following examples specifically illustrate the present invention. Examples 1 to 5 and 32 are given for comparative purposes.

The properties of the permeable membranes in these examples were measured by the following methods.

Tensile Strength

Measured in accordance with JIS-Z1702

$N_2$ Permeability

Measured at 24° C in accordance with ASTM-D1434-58, and converted to a value per 0.03 mm of film thickness.

Moisture Permeability

Measured in accordance with JIS-Z0208, and converted to a value per 0.03 mm of film thickness.

Salt Rejection

A reverse osmosis experiment is performed at a pressure of 60 atmospheres with respect to an aqueous solution of sodium chloride in a concentration of 5 g/liter, and the salt rejected (that did not permeate through the membrane) is expressed in percent.

Water Permeability

In the salt rejection test, the volume of water which has permeated through the membrane per unit area of membrane per unit time.

Microbe-free packageability

An agar culture broth is placed in a glass Petri dish (not covered), and packed with a specimen, followed by heat sealing. The pack is placed for 60 minutes in a sterilizing gaseous mixture consisting of ethylene oxide and Freon 12 (in a volume ratio of 18:82). In the packed state, the specimen is allowed to stand indoors for one week. The number of colonies generated is counted.

When the membrane packing the culture medium is a permselective membrane which permits the permeation of the sterilizing gas selectively but does not permit the permeation of microbes, no microbial colony occurs. If it is a non-permeable membrane that does not permit the permeation of both the sterilizing gas and the microbe, the microbe present before the packing cannot be killed. If it is a non-selectively permeable membrane the intrusion of microbes after sterilization cannot be prevented, and microbial colonies occur.

EXAMPLE 1

Comparative 50 parts by weight of isotactic polypropylene having a melt index of 2 and 50 parts by weight of low-density polyethylene having a density of 0.919 and a melt index of 0.25 were kneaded by a roll at a temperature of 180° C, and formed into a 0.5 mm-thick sheet by a press held at 200° C. Using a tender biaxial stretcher, the sheet was stretched 200% in each of the longitudinal and transverse directions in an air constant temperature tank held at 170° C. The resulting film had N₂ permeability and moisture permeability as low as in ordinary plastic films, and did not have the properties of a permselective membrane, as shown in Table 4.

EXAMPLE 2
Comparative

The stretched film obtained in Example 1 was immersed in the stretched and set condition in p-xylene at 80° C for 5 minutes, and then dried. The resulting film had low N₂ permeability and moisture permeability, and did not have satisfactory properties as a permselective membrane, as shown in Table 4.

EXAMPLE 3
Comparative

An agar culture broth was placed in a Petri dish and allowed to stand for one week at 25° C. 32 colonies of microbes were observed, as shown in Table 4.

EXAMPLE 4
Comparative

70 Parts by weight of polypropylene having a melt index of 2 and 30 parts by weight of polyvinyl chloride having an average degree of polymerization of 800 were kneaded by means of a roll at 200° C, and formed into a 0.5mm-thick sheet by a press at 200° C. A number of polyvinyl chloride particles were observed in the sheet. The sheet was stretched biaxially 200% in each of the longitudinal and transverse directions in an air constant temperature tank at 180° C using a tenter biaxial stretcher. The resulting sheet has coarse pores. The properties of this membrane are shown in Table 4.

The polymer combination in this Example had a non-transparency upon stretching of 85%, and was found to be unsuitable for the process of the present invention.

EXAMPLE 5
Comparative

60 Parts by weight of polypropylene having a melt index of 2, 40 parts by weight of polyvinyl chloride having an average degree of polymerization, 10 parts by weight of dioctyl phthalate (DOP), and 3.5 parts by weight of dibutyl tin maleate-type stabilizer (DBTM for short; T-116J, a trademark for a product of Katsuta Kako K.K.) were kneaded by a roll at 190° C and formed into a 0.5 mm-thick sheet press at 200° C.

The sheet was immersed in cyclohexane at 80° C for 20 minutes, and then dried. Then, it was stretched biaxially 200% in each of the longitudinal and transverse directions in an air constant temperature tank using a tenter biaxial stretcher.

The properties of the films, as shown in Table 4, were unsatisfactory as a permselective membrane.

The polymer combination in this Example had a non-transparency on stretching of 90%, and was found to be unsuitable for the process of this invention.

EXAMPLE 6

The press-formed sheet obtained in Example 1 was immersed for 5 minutes in p-xylene at 80° C, and dried. Then, it was stretched 200% in each of the longitudinal and transverse directions in an air constant temperature tank at 170° C using a tenter biaxial stretcher. The properties of the resulting film are shown in Table 4. It can be seen that the film had very high N₂ permeability and moisture permeability, and also high salt rejection, and water permeability and superior microbe-free packageability.

The compatibility of the polymer components in this Example was such that the non-transparency on stretching was 17%, and the non-transparency on treatment with p-xylene at 80° C was 85%.

EXAMPLE 7

90 Parts by weight of polypropylene having a melt index of 5 and 10 parts by weight of polyethylene oxide having an average molecular weight of 250,000 were kneaded using a kneader at 170° to 200° C, and formed into a 0.5 mm-thick sheet by a press at 180° C. The sheet was immersed in water at 100° C for 10 minutes, dried, and then stretched 100% in each of the longitudinal and transverse directions in an air constant temperature tank at 165° C using a tenter biaxial stretcher. The properties of the film are shown in Table 4, and are superior as a permselective membrane.

The compatibility of the polymer components in this example was such that the non-transparency on stretching was 24%, and the non-transparency on treatment with solvent at 100° C was 63%.

EXAMPLE 8

70 Parts by weight of polypropylene having a melt index of 9 and 30 parts by weight of polystyrene having a melt index of 5 was kneaded by a roll at 180° C, and formed in to a 0.5 mm-thick sheet by a press at 180° C. The sheet was immersed for 5 minutes in toluene at 90° C, washed with acetone, dried, and stretched 700% in each of the longitudinal and transverse directions in an air constant temperature tank at 175° C using a tenter biaxial stretcher. The properties of the film, as shown in Table 4, were superior.

The compatibility of the components (A) and (B) in this example was such that the non-transparency on stretching was 37%, and the non-transparency on treatment with toluene at 90° C was 90%.

EXAMPLE 9

60 Parts by weight of polypropylene having a melt index of 2 and 40 parts by weight of an ethylene/vinyl acetate copolymer (containing 15% by weight of vinyl acetate and having a melt index of 3) were kneaded by a Banbury mixer at 180° to 200° C, pelletized, and extruded through a T-die held at 250° C into a 1 mm-thick sheet using an extruder. The sheet was immersed for 10 minutes in toluene at 70° C, dried, and then stretched 1000% in the longitudinal direction by a roll longitudinal stretcher at 155° C and then 5% in the transverse direction by a tenter transverse stretcher at 165° C. The properties of the film, as shown in Table 4, were superior.

EXAMPLE 10

80 Parts by weight of polypropylene having a melt index of 3 and 20 parts by weight of an ethylene/acrylic acid copolymer (containing 10% by weight of acrylic acid and having a melt index of 5) were kneaded by a roll at 190° C, and formed into a 0.5 mm-thick film by a press held at 200° C. The resulting sheet was immersed for 5 minutes in toluene at 70° C, dried, and stretched 1500% in the longitudinal direction in an air constant temperature tank at 175° C using a tenter biaxial stretcher while fixing the film to the tenter so that it did not shrink in the transverse direction. The properties of the film, as shown in Table 4, were superior.

EXAMPLES 11 to 30

Sheets were prepared from the compositions shown in Table 2 in the proportions shown in Table 2 under the conditions shown in Table 3. The sheets were each treated with a solvent, dried, and stretched to form permeable membranes. The properties of the permeable membranes obtained are shown in Table 4.

The results demonstrate that permeable membranes having superior properties can be obtained by the process of this invention.

Table 2

| Example | Component (A) Kind | wt. part | Component (B) Kind | wt. part | Other component Kind | wt. part |
|---|---|---|---|---|---|---|
| 11 | Polypropylene (MI = 7) | 30 | Atactic polypropylene (MI = 5) | 70 | none | |
| 12 | Polypropylene (MI = 2) | 50 | Nylon 6 (Toray Amilan CM1011) | 50 | none | |
| 13 | Polypropylene (MI = 0.5) | 60 | Poly(butene-1) (MI = 10) | 40 | none | |
| 14 | Polypropylene (MI = 0.3) | 70 | Petroleum paraffin wax (m.p. = 65° C) | 30 | none | |
| 15 | Polypropylene (MI = 4) | 40 | Ethylene-propylene copolymer (ethylene/propylene 70/30 wt ratio, MI = 5) | 60 | Lubricant (VLTN-5*) | 5 |
| 16 | Polyethylene (density 0.956, MI = 0.3) | 60 | Ethylene-vinyl acetate copolymer (vinyl acetate 25 wt.%, MI = 3) | 40 | none | |
| 17 | Polyethylene (density 0.953, MI = 3.5) | 90 | Petroleum microcrystalline (m.p. 70° C) | 10 | none | |
| 18 | Polyethylene (density 0.943, MI = 6) | 40 | Atactic polypropylene (MI = 3) | 60 | none | |
| 19 | Polyethylene (density 0.956, MI = 0.3) | 30 | Ethylene-acrylic acid copolymer (acrylic acid 20 wt.%, MI = 3) | 70 | none | |
| 20 | Polyethylene (density 0.919, MI = 0.3) | 60 | Nylon 6 (Toray Amilan CM1011) | 40 | none | |
| 21 | Polyethylene (density 0.959, MI = 3.5) | 70 | Nylon 66 (Toray Amilan CM3011) | 30 | none | |
| 22 | Polyethylene (density 0.960, (MI = 6.0) | 50 | Polystyrene (MI = 3.9) | 50 | none | |
| 23 | Polyethylene (density 0.950, MI = 0.3) | 50 | Poly(butene-1) (MI = 10) | 50 | Calcium carbonate powder (WHITE p-10)** Toray tetron*** | 20 5 |
| 24 | Polyethylene (density 0.956, (MI = 0.3) | 70 | Polyethylene oxide (average molecular weight 2,500,000 – 3,000,000) | 30 | none | |
| 25 | Polyethylene (density 0.957, (MI = 1.7) | 50 | Ethylene-propylene copolymer (ethylene/propylene 50/50 wt.ratio, MI = 5) | 50 | none | |
| 26 | Nylon 6 (Toray Amilan CM1011) | 50 | Ethylene-vinyl acetate copolymer (vinyl acetate 15 wt.%, MI = 3) | 50 | none | |
| 27 | Nylon 6 (Toray Amilan CM1011) | 60 | Ethylene-acrylic acid copolymer (acrylic acid 20 wt.%, MI = 3) | 40 | none | |
| 28 | Nylon 66 (Toray Amilan CM3011) | 50 | Ethylene-acrylic acid copolymer (acrylic acid 20 wt.%, MI = 3) | 50 | none | |
| 29 | Nylon 66 (Toray Amilan CM3011) | 50 | Nylon 6 (Toray Amilan CM1011) | 50 | none | |
| 30 | Polyethylene terephthalate (Toray Tetron****) | 50 | Polystyrene (MI = 5) | 50 | none | |

*Product of Kawaken fine chemical Co.
**Product of Shiraishi Kogyo K.K.
***Polyester fibers of 2 denier and 3 mm length. (Product of Toray Industries, Inc.)
****Polyester fibers of 2 denier were used after melting. (Product of Toray Industries, Inc.)

Table 3

| Example No. | Sheet Formation Method | Temp. (C.) | Thickness (mm) | Solvent treatment Kind | Temp. (C.) | Time (min) | Stretching Method | Temp. (C.) | Longitudinal (%) | Transverse (%) |
|---|---|---|---|---|---|---|---|---|---|---|
| 11 | Roll kneading, press | 200 | 2 | Cyclohexane | 80 | 1 | Tenter, biaxial | 170 | 50 | 50 |
| 12 | Roll kneading, press | 240 | 1 | Acetic acid | 100 | 2 | Tenter, biaxial | 160 | 300 | 300 |
| 13 | Kneader kneading, extruder, T-die | 270 | 0.7 | Ethyl cyclohexane | 70 | 0.5 | Roll, (longitudinal direction) | 155 | 200 | 100 |
| | | | | | | | Tenter, (transverse | 160 | | |

Table 3-continued

| Example No. | Sheet Formation Method | Temp. (°C.) | Thickness (mm) | Solvent treatment Kind | Temp. (°C.) | Time (min) | Stretching Method | Temp. (°C.) | Longitudinal (%) | Transverse (%) |
|---|---|---|---|---|---|---|---|---|---|---|
| 14 | Roll kneading, press | 200 | 0.5 | Toluene | 60 | 0.5 | Tenter, biaxial (direction) | 170 | 500 | 500 |
| 15 | Banbury kneading, calender roll | 180~190 | 0.3 | p-xylene | 70 | 10 sec. | Roll, monoaxial | 130 | 700 | — |
| 16 | Dry-blend extruder, T-die | 250 | 0.5 | Toluene | 50 | 1 | Roll, monoaxial | 140 | 1000 | — |
| 17 | Banbury kneading, inflation | 230 | 0.2 | Toluene (one-surface treatment) | 40 | 3 | Roll, monoaxial | 130 | 600 | — |
| 18 | Roll kneading, press | 200 | 0.5 | Cyclohexane | 60 | 10 | Cramp, monoaxial | 150 | 300 | — |
| 19 | Roll kneading, press | 200 | 2 | Toluene | 50 | 1 | Tenter, biaxial | 160 | 50 | 50 |
| 20 | Roll kneading, press | 240 | 2 | Acetic acid | 100 | 5 | Cramp, monoaxial | 140 | 600 | — |
| 21 | Roll kneading, press | 270 | 3 | Cresol | 100 | 30 | Cramp, monoaxial | 20 | 300 | — |
| 22 | Roll kneading, press | 200 | 5 | Butyl acetate | 110 | 60 | Tenter restrained, monoaxial | 150 | 300 | — |
| 23 | Roll kneading, press | 200 | 1 | Ethyl cyclohexane | 70 | 5 | Tenter restrained, monoaxial | 160 | 700 | — |
| 24 | Kneader kneading, extruder, T-die | 240 | 1 | Water | 90 | 10 | Roll, monoaxial | 150 | 500 | — |
| 25 | Roll kneading, press | 180 | 0.5 | Toluene | 50 | 10 | Tenter restrained, monoaxial | 165 | 200 | — |
| 26 | Roll kneading, press | 240 | 0.5 | Toluene | 50 | 30 | Tenter, biaxial | 250 | 200 | 200 |
| 27 | Roll kneading, press | 240 | 0.5 | Toluene | 50 | 10 | Tenter restrained, monoaxial | 240 | 400 | — |
| 28 | Roll kneading, press | 270 | 0.5 | Toluene | 50 | 10 | Tenter restrained, monoaxial | 260 | 200 | — |
| 29 | Roll kneading, press | 270 | 0.5 | Acetic acid | 100 | 10 | Cramp, monoaxial | 270 | 400 | — |
| 30 | Roll kneading, press | 270 | 0.5 | Toluene | 70 | 5 | Tenter restrained, monoaxial | 260 | 200 | |

Table 4

| Example No. | Tensile strength (longitudinal/transverse) (Kg/cm$^2$) | N$_2$ permeability (cc/m$^2$ · hr · atm) | Moisture permeability (g/m$^2$ · 24hr) | Salt rejection (%) | Water permeability (l/m$^2$ · day) | Microbe-free packageability |
|---|---|---|---|---|---|---|
| 1 | 314/306 | 74 | 17 | Measurement impossible | Measurement impossible* | 7 |
| 2 | 263/279 | 112 | 22 | Measurement impossible | Measurement impossible* | 5 |
| 3 | — | — | — | | | 32 |
| 4 | 115/104 | infinite (measurement impossible) | infinite (measurement impossible) | 0 | Measurement impossible** | 21 |
| 5 | 184/177 | 125 | 34 | Measurement impossible | Measurement impossible* | 8 |
| 6 | 242/253 | infinite (measurement impossible) | 36,842 | 99.8 | 514 | 0 |
| 7 | 317/309 | " | 23,524 | 99.5 | 382 | 0 |
| 8 | 274/263 | " | 32,451 | 98.2 | 275 | 0 |
| 9 | 368/124 | " | 42,654 | 98.6 | 476 | 0 |
| 10 | 389/ 96 | " | 51,211 | 95.4 | 421 | 0 |
| 11 | 112/ 95 | " | 46,741 | 96.7 | 102 | 0 |
| 12 | 412/406 | " | 34,562 | 97.9 | 411 | 0 |
| 13 | 279/217 | " | 37,247 | 99.5 | 263 | 0 |
| 14 | 216/210 | " | 44,135 | 98.4 | 217 | 0 |
| 15 | 264/118 | " | 58,328 | 97.2 | 327 | 0 |
| 16 | 275/ 94 | " | 34,976 | 97.4 | 162 | 0 |
| 17 | 263/102 | " | 25,712 | 99.2 | 175 | 0 |
| 18 | 142/ 67 | " | 29,827 | 98.0 | 234 | 0 |

Table 4-continued

| Example No. | Tensile strength (longitudinal/ transverse (Kg/cm²)) | N₂ permeability (cc/m². hr . atm) | Moisture permeability (g/m². 24hr) | Salt rejection (%) | Water permeability (l/m² . day) | Microbe-free package-ability |
|---|---|---|---|---|---|---|
| 19 | 134/130 | " | 12,445 | 95.2 | 209 | 0 |
| 20 | 297/114 | " | 36,254 | 98.6 | 363 | 0 |
| 21 | 316/115 | " | 27,633 | 99.0 | 489 | 0 |
| 22 | 216/103 | " | 34,769 | 99.8 | 472 | 0 |
| 23 | 198/ 82 | " | 42,578 | 97.1 | 437 | 0 |
| 24 | 236/ 92 | " | 39,734 | 99.4 | 526 | 0 |
| 25 | 114/ 76 | " | 31,265 | 99.7 | 511 | 0 |
| 26 | 374/362 | " | 37,927 | 99.9 | 547 | 0 |
| 27 | 432/217 | " | 26,491 | 98.7 | 528 | 0 |
| 28 | 414/311 | " | 28,372 | 99.8 | 535 | 0 |
| 29 | 586/224 | " | 32,179 | 98.5 | 503 | 0 |
| 30 | 665/329 | " | 27,596 | 98.2 | 492 | 0 |

*Measurement impossible because the value was too small.
**Measurement impossible because the value was too large.

EXAMPLE 31

60 Parts by weight of polypropylene having a melt index of 2 and 40 parts by weight of polyethylene having a density of 0.919 and a melt index of 0.3 were kneaded at 180° to 220° C using a Banbury mixer. The molten mixture was spun at a nozzle temperature of 270° C using a melt-spinning machine having an annular nozzle. The as-spun filments were immediately cooled and solidified in methanol to form hollow filaments each of which had an outside diameter of 1.2 mm and a wall thickness of 0.3 mm.

The hollow filments were immersed for 1 minute in p-xylene at 90° C to treat only the outer surface of the filaments. Then, the filmants were immersed for 1 minute in acetone at 25° C, dried, and stretched monoaxially 300%.

The hollow filments obtained had a salt rejection of 99.8% and a water permeability of 582 liters/m²·day (based on the outside surface of the filaments).

EXAMPLE 32

Comparative

30 Parts by weight of polyethylene having a melt index of 0.3 and a density of 0.96 and 70 parts by weight of calcium sulfite hemihydrate ($CaSO_3 \cdot \frac{1}{2}H_2O$) powder were kneaded by a roll at 160° C, and formed into a 1 mm-thick sheet by means of a press at 180° C.

The sheet was immersed for 1 hour in 3N hydrochloric acid at 50° C, washed with water, dried, and then stretched monoaxially 150% (stretch ratio 2.5).

The product obtained has an $N_2$ permeability of 275 cc/m²·hr·atm and a moisture permeability of 18 g/m²·24 hr which were as low as ordinary plastic films. The water permeability was too low to be measured. The product film was an ordinary film having no permselectivity.

In the composition obtained from the components in this Example, the calcium sulfite powder was solid at the time of melt mixing, and the resulting mixture only assumed a sea-island structure in which the calcium sulfite powder was dispersed in polyethylene. Thus, the combination of components A and B in this example lacks compatibility and is unsuitable for the process of this invention.

EXAMPLES 33 to 37

Sheets were prepared from compositions of the components shown in Table 5 in the proportions indicated in Table 5 under the conditions shown in Table 6. Each of the sheets was subjected to solvent treatment, dried, and stretched to form permeable membranes.

The properties of the resulting permeable membranes are shown in Table 7. The results show that permselective membranes having superior properties can be obtained by the process of this invention.

Table 5

| Examples | Component (A) Kind | Parts by weight | Component (B) Kind | Parts by weight | Other components Kind | Parts by weight |
|---|---|---|---|---|---|---|
| 33 | Nylon 11 (product of Rilsan Company, BMN) | 50 | Polyethylene oxide (average molecular weight, 200 to 300 thousand) | 50 | none | |
| 34 | Nylon 12 (average molecular weight 2.5 to 3 million) | 50 | Polyvinyl acetate (average molecular weight 1 to 1.5 million) | 50 | none | |
| 35 | Polystyrene (melt index 5) | 60 | Polyisobutylene (Mooney viscosity 30) | 40 | none | |
| 36 | ABS resin (Krarastic) MHA, a product of Sumitomo Chemical | 55 | Polymethyl methacrylate (melt index 13) | 45 | none | |
| 37 | Polyvinyl chloride (average degree of polymerization 1100) | 55 | Polyvinyl acetate (average molecular weight 1 to 1.5 million) and polymethyl methacrylate (melt index 1.0) | 25 / 20 | DOP* / DBTM** | 15 / 2 |

*dioctyl phthalate
**dibutyl tin maleate

Table 6

| Examples | Sheet formation | | | Solvent treatment | | | Stretching | | |
|---|---|---|---|---|---|---|---|---|---|
| | Method | Temperature (°C) | Sheet Thickness (mm) | Solvent | Temperature (°C) | Time (minutes) | Method | Temperature (°C) | Extent of Stretching (%) |
| 33 | Roll kneading, press | 250 | 0.5 | Water | 100 | 30 | Tenter, monoaxial | 200 | 150 |
| 34 | Roll kneading, press | 250 | 0.5 | Ethanol | 30 | 30 | Tenter, monoaxial | 190 | 250 |
| 35 | Banbury mixer kneading; extruder, T-die | 150 | 0.3 | Diisobutylene | 30 | 10 | Roll, monoaxial | 80 | 500 |
| 36 | Roll kneading, press | 150 | 0.5 | Acetone | 30 | 20 | Tenter, monoaxial | 90 | 100 |
| 37 | Roll kneading, press | 180 | 0.5 | Acetone | 30 | 30 | Tenter, monoaxial | 140 | 400 |

Table 7

| Examples | Tensile strength (longitudinal/transverse) ($Kg/cm^2$) | $N_2$ permeability ($cc/m^2 \cdot hr \cdot atm$) | Moisture permeability ($g/m^2 \cdot 24\ hr$) | Salt rejection (%) | Water permeability (liter/$m^2 \cdot day$) | Microbe-free packageability |
|---|---|---|---|---|---|---|
| 33 | 527/214 | Infinite (unmeasurable) | 57965 | 98.0 | 512 | 0 |
| 34 | 574/195 | Infinite (unmeasurable) | 55412 | 99.2 | 474 | 0 |
| 35 | 412/107 | Infinite (unmeasurable) | 32764 | 97.5 | 125 | 0 |
| 36 | 361/211 | Infinite (unmeasurable) | 31611 | 98.4 | 114 | 0 |
| 37 | 533/114 | Infinite (unmeasurable) | 34527 | 97.7 | 192 | 0 |

What we claim is:

1. A process for producing a permeable membrane, which comprises mixing, in a molten state, (A) 90 to 30 parts by weight of at least one thermoplastic linear organic synthetic resin having stretchability with (B) 10 to 70 parts by weight of at least one compound having partial compatibility with the synthetic resin (A) and selected from the group consisting of synthetic polymers or oligomers containing at least 20 carbon atoms, natural organic polymeric compounds containing at least 20 carbon atoms, fatty acids containing at least 16 carbon atoms, and esters or salts of said fatty acids, the total amount of components (A) and (B) being 100 parts by weight; fabricating the resultant molten mixture into a film or sheet in which components (A) and (B) are present in a partly mutually dissolved state; treating said film or sheet with a solvent which is a good solvent for component (B) but a poor solvent for component (A), for a time sufficient to remove 50 to 100% by weight of component (B) from said film or sheet; drying the thus treated film or sheet until the amount of said solvent in or adhering to said film or sheet is not more than 10% by weight based on the total weight of said solvent and said film or sheet; and stretching the dried film or sheet 50 to 1500% monoaxially or biaxially to form a network of continuous pores in the film or sheet.

2. The process of claim 1 wherein components (A) and (B) are selected from the following combinations, (1) component (A) is selected from isotactic polypropylene, maleinized polypropylene, acrylate-modified polypropylene, chlorinated polypropylene, and sulfonated polypropylene, and component (B) is selected from polyethylene, polyethylene oxide, an ethylene/vinyl acetate copolymer, an ethylene/acrylic acid copolymer, an ethylene/maleic acid copolymer, polystyrene, atactic polypropylene, nylon 6, poly(butene-1), wax, an ethylene/propylene copolymer, a styrene/butadiene copolymer, natural rubber, polybutadiene rubber, polyisoprene rubber, an isobutylene/isoprene copolymer rubber, polyisobutylene, polyvinyl alcohol, maleinized polyethylene, acrylate-modified polyethylene, chlorinated polyethylene, sulfonated polyethylene, and polymethyl methacrylate;

(2) component (A) is isotactic polypropylene, and component (B) is selected from maleinized polypropylene, acrylate-modified polypropylene, chlorinated polypropylene, sulfonated polypropylene, a propylene/acrylic acid copolymer, and a propylene/maleic acid copolymer;

(3) component (A) is selected from polyethylene, maleinized polyethylene, acrylate-modified polyethylene, chlorinated polyethylene and sulfonated polyethylene, and component (B) is selected from an ethylene/vinyl acetate copolymer, wax, atactic polypropylene, an ethylene/acrylic acid copolymer, nylon 6, nylon 66, polystyrene, poly(butene-1), polyethylene oxide, an ethylene/propylene copolymer, an ethylene/maleic acid copolymer, polyvinyl alcohol, a styrene/butadiene copolymer, natural rubber, polybutadiene rubber, polyisoprene rubber, an isobutylene/isoprene copolymer rubber, polyisobutylene, a propylene/acrylic acid copolymer, a propylene/maleic acid copolymer and polymethyl methacrylate;

(4) component (A) is selected from polyamides and linear polyesters, and component (B) is selected from polyethylene, polyethylene oxide, an ethylene/vinyl acetate copolymer, an ethylene/acrylic acid copolymer, polystyrene, wax, poly(butene-1), isotactic polypropylene, atactic polypropylene, polyvinyl alcohol, polyvinyl acetate, an ethylene/maleic acid copolymer, a propylene/acrylic acid copolymer, a propylene/maleic acid copolymer, maleinized polypropylene, acrylate-modified polypropylene, chlorinated polypropylene, sulfonated polypropylene, maleinized polyethylene, acrylate-modified polyethylene, chlorinated polyethylene, sulfonated polyethylene, polyvinyl chloride and polymethyl methacrylate;

(5) component (A) is nylon 66 and component (B) is nylon 6, or component (A) is a linear polyester and component (B) is selected from nylon 6 and nylon 66;

(6) component (A) is selected from polystyrene, an ABS resin, an acrylonitrile/styrene copolymer and a styrene/divinylbenzene copolymer, and component (B) is selected from a styrene/butadiene copolymer, natural rubber, polybutadiene rubber, polyisoprene rubber, an isobutylene/isoprene copolymer rubber, polyisobutylene, polymethyl methacrylate, polyvinyl acetate, polyethylene oxide, polyvinyl alcohol, atactic polypropylene and polyvinyl chloride; and (7) component (A) is polyvinyl chloride, and component (B) is selected from polyvinyl acetate, polymethyl methacrylate, polystyrene, an ethylene/vinyl acetate copolymer, an ethylene/acrylic acid copolymer, an ethylene/maleic acid copolymer, a propylene/acrylic acid copolymer, a propylene/maleic acid copolymer, maleinized polyethylene, acrylate-modified polyethylene, chlorinated polyethylene, sulfonated polyethylene, maleinized polypropylene, acrylate-modified polypropylene, chlorinated polypropylene, sulfonated polypropylene, polyethylene oxide, polyvinyl alcohol, polychloroprene, and a butadiene/acrylonitrile copolymer.

3. The process of claim 1 wherein the stretching of said dried film or sheet is carried out at a temperature lower than the melting temperature of said dried film or sheet but above 0° C in one direction either in the free state or while restraining the shrinkage of said dried film or sheet in the other direction.

4. The process of claim 1 wherein the stretching of said dried film or sheet is carried out biaxially at a temperature below the melting temperature of said dried film or sheet but not below a temperature 50° C lower than said melting temperature.

* * * * *